US007783680B2

(12) United States Patent
Fagin et al.

(10) Patent No.: US 7,783,680 B2
(45) Date of Patent: Aug. 24, 2010

(54) QUASI-INVERSES OF SCHEMA MAPPINGS

(75) Inventors: Ronald Fagin, Los Gatos, CA (US); Phokion Gerasimos Kolaitis, Los Altos, CA (US); Lucian Popa, San Jose, CA (US); Wang-Chiew Tan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 11/970,057

(22) Filed: Jan. 7, 2008

(65) Prior Publication Data

US 2009/0177681 A1 Jul. 9, 2009

(51) Int. Cl.
*G06F 7/00* (2006.01)
*G06F 17/30* (2006.01)

(52) U.S. Cl. ...................................................... 707/809

(58) Field of Classification Search ................. 707/796, 707/807, 809; 706/17
See application file for complete search history.

(56) References Cited

U.S. PATENT DOCUMENTS

| | | | | |
|---|---|---|---|---|
| 6,292,829 | B1 | 9/2001 | Huang et al. | |
| 6,341,291 | B1 | 1/2002 | Bentley et al. | |
| 7,149,746 | B2 * | 12/2006 | Fagin et al. | 1/1 |
| 7,567,943 | B2 * | 7/2009 | Nash et al. | 706/17 |
| 7,676,484 | B2 * | 3/2010 | Fagin | 1/1 |
| 7,689,581 | B2 * | 3/2010 | Fagin et al. | 1/1 |
| 2003/0217069 | A1 * | 11/2003 | Fagin et al. | 707/102 |
| 2006/0136463 | A1 * | 6/2006 | Nash et al. | 707/102 |
| 2007/0168381 | A1 * | 7/2007 | Fagin et al. | 707/102 |
| 2008/0243765 | A1 * | 10/2008 | Fuxman et al. | 707/2 |

FOREIGN PATENT DOCUMENTS

| | | |
|---|---|---|
| JP | 2006172436 | 6/2006 |

OTHER PUBLICATIONS

Popa et al., "Translating web data", Technical Report CSRG-441, Department of Computer Science, University of Toronto, published in Feb. 2002.*

Ronald Fagin etl., "Composing Schema Mappings", IBM Almaden Research Center, Published in Dec. 2005.*

Bernstein et al.; Model Management 2.0: Manipulating Richer Mappings; Microsoft Corporation, One Microsoft Way, Redmond, WA 98052-6399 U.S.A.; 12 pages.

Fagin et al.; Quasi-inverses of Schema Mappings; PODS'07, Jun. 11-13, 2007, Beijing, China; Copyright 2007 ACM; pp. 123-132.

* cited by examiner

*Primary Examiner*—Hung T Vy
(74) *Attorney, Agent, or Firm*—Schmeiser, Olsen & Watts

(57) ABSTRACT

A method and system for processing a schema mapping M from a source schema S to a target schema T by executing program code on a processor of a computer system. A schema mapping M' from T to S is determined via processing the schema mapping M. The schema mapping M includes at least one constraint σ. Each constraint σ consists of a source-to-target tuple-generating dependencies (s-t tgd). The schema mapping M' includes at least one constraint σ'. Each constraint σ' consists of a disjunctive tgd with constants and inequalities among the constants. The schema mapping M' is stored in at least one computer usable storage device of the computer system and/or is outputted in at least one output device of the computer system.

1 Claim, 11 Drawing Sheets

195
Create Equivalent Schema Mapping M* from M

200
Invert Each Constraint σ* in M* to Generate Schema mapping M' from Target to Source 205
Store and/or Output Schema Mapping M'

200

210
Construct Set G of Minimal Generators for Conclusion of each Constraint σ*

220
Construct Inverse σ' of each Constraint σ* using set G

Emp:

| ssn | name | addr |
|---|---|---|
| 175059999 | Alice | 100 Clover Pl. |
| 237007777 | Bob | 210 Foster Ct. |

WorkedOn:

| ssn | pname | duration |
|---|---|---|
| 175059999 | iNet | 2yr |
| 237007777 | zMap | 3yr |

EmpEval:

| ssn | name | pname | duration | eval |
|---|---|---|---|---|
| 175059999 | Alice | iNet | 2yr | $file_1$ |
| 175059999 | Alice | uDB | 5yr | $file_2$ |

Database Instance $\mathcal{I}$ Over Schema $\mathcal{S}$

FIG. 1

Schemas S and T, Together With Schema Mapping $M = \{t_1, t_2\}$

Schemas S and T, Together With Schema Mapping M = $\{t_1, t_2\}$

Source Instance I

Emp:

| ssn | name | addr |
|---|---|---|
| 175059999 | Alice | 100 Clover Pl. |
| 237007777 | Bob | 210 Foster Ct. |

WorkedOn:

| ssn | pname | duration |
|---|---|---|
| 175059999 | iNet | 2yr |
| 237007777 | zMap | 3yr |

EmpEval:

| ssn | name | pname | duration | eval |
|---|---|---|---|---|
| 175059999 | Alice | iNet | 2yr | $file_1$ |
| 175059999 | Alice | uDB | 5yr | $file_2$ |

Target Instance J

TEmp:

| eid | ssn | name |
|---|---|---|
| $E_1$ | 17505999 | Alice |
| $E_2$ | 23700777 | Bob |

EmpProjSummary:

| eid | pname | duration | eval |
|---|---|---|---|
| $E_1$ | iNet | 2yr | file1 |
| $E_2$ | zMap | 3yr | $F_2$ |
| $E_1$ | uDB | 5yr | file2 |

Exemplary Database Instances I and J such that (I,J) Satisfies Schema Mapping $M = \{t_1, t_2\}$.

FIG. 3

M: Emp(s,n,a) ⟶ Temp(s,n)

Quasi-inverse M': TEmp(s,n) ⟶ ∃A Emp(s,n,A)

Example of Non-Invertible Schema Mapping M that is Quasi-Invertible and M' is a Quasi-Inverse.

$$M: \quad Emp_1(s,n) \longrightarrow TEmp(s,n)$$
$$Emp_2(s,n) \longrightarrow TEmp(s,n)$$

$$\text{Quasi-inverse} \quad M': \quad TEmp(s,n) \longrightarrow Emp_1(s,n) \vee Emp_2(s,n)$$

Example of Non-Invertible Schema Mapping M that is Quasi-Invertible and M' is a Quasi-Inverse.

Chasing Source Instance I Produces a Canonical Target Instance $J_c$.

Chasing Source Instance I Produces a Canonical Target Instance $J_c$.

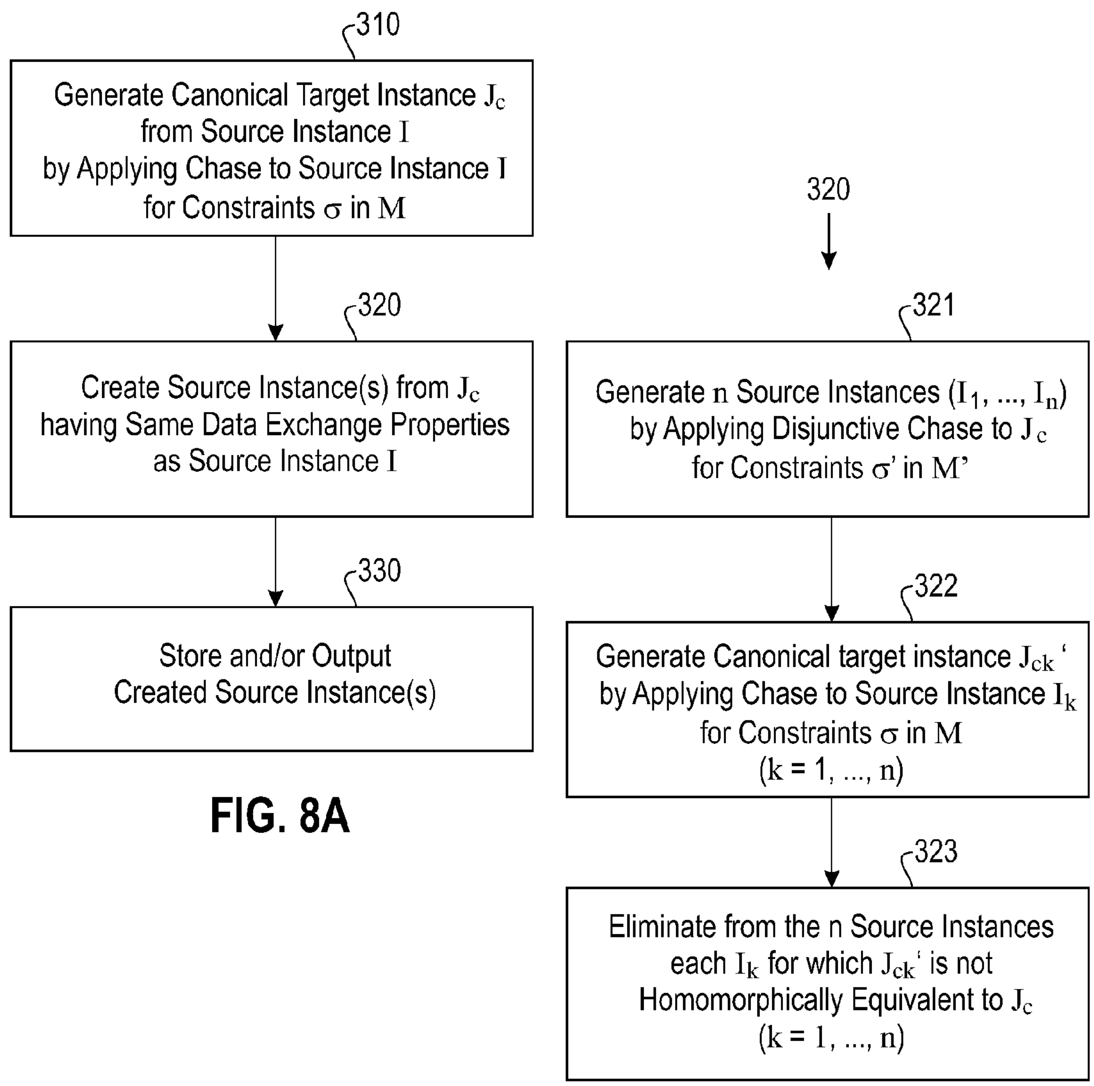
310
Generate Canonical Target Instance $J_c$ from Source Instance I by Applying Chase to Source Instance I for Constraints σ in M
320
Create Source Instance(s) from $J_c$ having Same Data Exchange Properties as Source Instance I
330
Store and/or Output Created Source Instance(s)
FIG. 8A
320
321
Generate n Source Instances ($I_1$, ..., $I_n$) by Applying Disjunctive Chase to $J_c$ for Constraints σ' in M'
322
Generate Canonical target instance $J_{ck}$' by Applying Chase to Source Instance $I_k$ for Constraints σ in M (k = 1, ..., n)
323
Eliminate from the n Source Instances each $I_k$ for which $J_{ck}$' is not Homomorphically Equivalent to $J_c$ (k = 1, ..., n)
FIG. 8B

QUASI-INVERSES OF SCHEMA MAPPINGS

FIELD OF THE INVENTION

The present invention provides a method for processing a schema mapping from a source schema to a target schema to generate quasi-inverses of the schema mapping.

BACKGROUND OF THE INVENTION

Schema mappings are declarative expressions that specify how data that conforms to one or more source schemas is transformed into data that conforms to a target schema. Such mappings can be viewed, in general, as high-level specifications of the data exchange process, and they can be compiled into multiple programming/query languages for the actual implementation of data exchange. A popular logical language for expressing schema mappings is the language of source-to-target tuple-generating dependencies, or source-to-target tgds.

A schema mapping from source to target is invertible if there is a schema mapping from target to source that can completely recover the data source (see Ronald Fagin, Inverting Schema Mappings. PODS 2006, pages 50-59). Existing methods of inverting (i.e., reversing) schema mappings are problematic. For example, most schema mappings in practice cannot be reversed for such reasons as a mapping may not export all source data (some filtering usually takes place), or several data sources may be integrated into one target instance which is a typical union scenario in which the information of where the data "came from" is lost.

Thus, there is a need for a method and system of reversing schema mappings that overcome at least one of the aforementioned difficulties with existing techniques for reversing schema mappings.

SUMMARY OF THE INVENTION

The present invention provides a method for processing a schema mapping M from a source schema S to a target schema T, said method performed by executing program code on a processor of a computer system, said method comprising:

determining a schema mapping M' from T to S via processing the schema mapping M, said mapping M comprising at least one constraint σ, each constraint σ consisting of a source-to-target tuple-generating dependencies (s-t tgd), said schema mapping M' comprising at least one constraint σ', each constraint σ' consisting of a disjunctive tgd with constants and inequalities among the constants; and storing the schema mapping M' in at least one computer usable storage device of the computer system and/or outputting the schema mapping M' in at least one output device of the computer system.

The present invention provides a computer program product, comprising a computer readable storage medium having a computer readable program code embodied therein, said computer readable program code containing instructions that when executed by a processor of a computer system implement a method for processing a schema mapping M from a source schema S to a target schema T, said method comprising:

determining a schema mapping M' from T to S via processing the schema mapping M, said schema mapping M comprising at least one constraint σ, each constraint σ consisting of a source-to-target tuple-generating dependencies (s-t tgd), said schema mapping M' comprising at least one constraint σ', each constraint σ' consisting of a disjunctive tgd with constants and inequalities among the constants; and storing the schema mapping M' in at least one computer usable storage device of the computer system and/or outputting the schema mapping M' in at least one output device of the computer system.

The present invention provides a computer system comprising a processor and a computer readable memory unit coupled to the processor, said memory unit containing instructions that when executed by the processor implement a method for processing a schema mapping M from a source schema S to a target schema T, said method comprising:

determining a schema mapping M' from T to S via processing the schema mapping M, said schema mapping M comprising at least one constraint σ, each constraint σ consisting of a source-to-target tuple-generating dependencies (s-t tgd), said schema mapping M' comprising at least one constraint σ', each constraint σ' consisting of a disjunctive tgd with constants and inequalities among the constants; and storing the schema mapping M' in at least one computer usable storage device of the computer system and/or outputting the schema mapping M in at least one output device of the computer system.

The present invention advantageously provides a method and system of reversing schema mappings that overcome at least one of the aforementioned difficulties with existing techniques in the related art for reversing schema mappings.

BRIEF DESCRIPTION OF THE DRAWINGS

FIG. 1 depicts an illustrative database instance I over a source schema S, in accordance with embodiments of the present invention.

FIG. 3 illustrates a pair of database instances that satisfies the schema mapping M of FIG. 2, in accordance with embodiments of the present invention.

FIGS. 8A and 8B are flow charts describing Algorithm B, in accordance with embodiments of the present invention.

DETAILED DESCRIPTION OF THE INVENTION

Figure 2A:
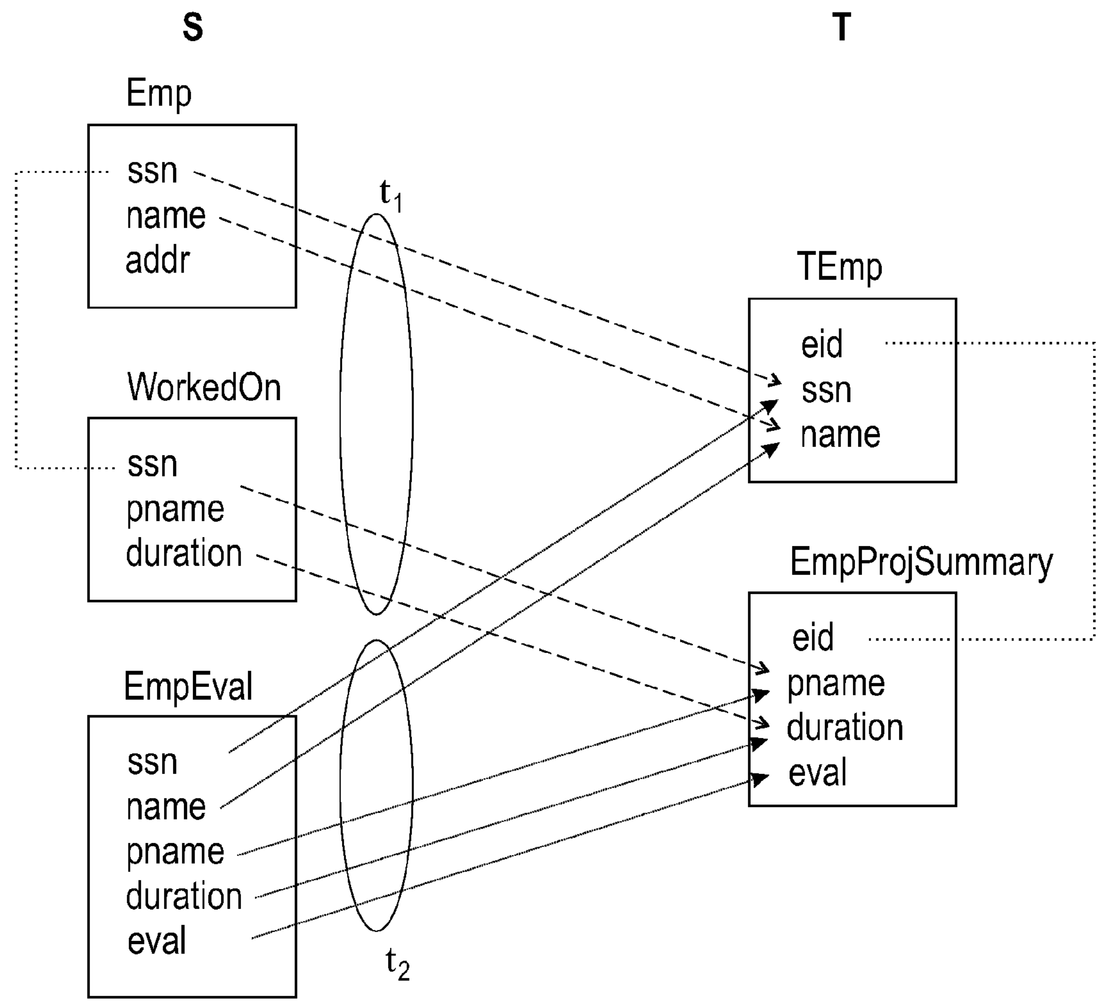
FIGS. 2A and 2B depict a pictorial view of how constraints of a mapping M relate tables and associated attributes in the source schema S of FIG. 1 to tables and associated attributes in a target schema T, in accordance with embodiments of the present invention.

The present invention provides a system and method for reversing the data exchange process in a schema mapping. In other words, given a schema mapping from a source schema to a target schema specified by source-to-target tuple-generating dependencies (tgds), the present invention computes a quasi-inverse of a schema mapping that can be used to transform the data in the "reverse direction" (i.e., from target to source), and then use computed quasi-inverse for performing a "reverse" data exchange.

The quasi-inverse of schema mapping of the present invention eliminates or mitigates restrictive aspects of the existing inverse of schema mappings. A beneficial consequence of the quasi-inverse of a schema mapping is that data exported data with the quasi-inverse of a schema mapping can be recovered. Thus, although the entire source data may not be recovered, enough of the data source is recovered so that when the same mapping is applied again, the same information is recovered again. Furthermore, natural quasi-inverses exist in many cases where inverses do not exist.

The present invention also introduces the language of disjunctive tgds with constants and inequalities, which is an extension of the standard language of tgds. It will be explained infra that if a schema mapping specified by a finite set of tgds is quasi-invertible, then the schema mapping has a natural quasi-inverse specified by a finite set of disjunctive tgds with constants and inequalities. Methods will be described infra for computing such quasi-inverses and for using the quasi-inverses in reverse data exchange. Specifically, Algorithm A and Algorithm B will be described.

With respect to Algorithm A, given a quasi-invertible schema mapping M specified by a finite set of source-to-target tgds, Algorithm A computes a quasi-inverse M' of M. Moreover, M' is expressed by a finite set of disjunctive tgds with constants and inequalities.

With respect to Algorithm B, the schema mapping M' that is the output of Algorithm A is used to implement "reverse" data exchange as follows. Given a target instance J that is the result of applying the "direct" data exchange with schema mapping M on some unknown source instance I, method B applies M' to compute a source instance I' such that performing data exchange on I' with M gives a target instance that is homomorphically equivalent to J. Thus, although the original (but unknown) source instance I cannot be recovered, method B recovers a source instance I' that produces the same result as I.

The remainder is the Detailed Description of the Invention is divided into the following sections:

1. APPLICATIONS
2. BASIC TERMS, CONCEPTS, AND NOTATION
3. QUASI-INVERSES OF SCHEMA MAPPINGS
4. ALGORITHM A (QUASI-INVERSE)
5. ADDITIONAL CONCEPTS FOR ALGORITHM B
6. ALGORITHM B (DATA EXCHANGE)
7. COMPUTER SYSTEM

1. Applications

1.1 Schema Evolution

When a schema S evolves into a new schema S', a database instance I that conforms with the old schema S must be migrated (i.e., transformed) into a new database instance I' that conforms to the new schema S'. This transformation can be represented as a schema mapping M from S to S'. The database instance I' will then have a separate lifecycle as I i.e., (new tuples will be added in I' and not in I). However, legacy applications or queries may continue to access the data by using the old schema S, since rewriting of these applications is typically time-consuming and expensive. In order to access the new data that is in I', a reverse transformation from S' to S is needed. Without the reverse transformation, the legacy applications or queries will continue to see the old data, which may not be desired. Note that the existing inverse is not applicable, since the mappings from S to S' that typically appear in schema evolution are not invertible. However, many of the mappings are quasi-invertible by the methodology of the present invention.

1.2 Storage and Retrieval of Data

Data originating from online public interfaces may be stored into internal repositories (or warehouses). The schema T of the repository does not match the schema S of an interface. Thus, a schema mapping from S to T must be created and the data must be transformed accordingly. At the same time, data must also be retrieved back, on demand, typically using the public interface schema and not the internal schema. This retrieval may be implemented by performing a quasi-inverse schema mapping from T to S to facilitate the retrieval of data.

1.3. Bidirectional Data Exchange

Independent organizations must often exchange data for collaboration of business purposes. The exchange of data often occurs in the form of messages that flow from one system (S) to another (T). In order to translate between the different schemas these systems use, schema mappings are necessary. Furthermore, to make the exchange bidirectional, schema mappings are needed in both direction; i.e., from S to T and from T to S. Typically, users manually program such mappings and there is no guarantee that one of the mappings is an inverse of the other of the mappings. The present invention can be used to automatically construct quasi-inverses so that only one mapping between a pair of systems needs to be developed. Again, the existing inverse is not applicable, since a mapping from two independently designed schemas S and T will likely be not invertible. However, many of such mappings are quasi-invertible.

2. Basic Terms, Concepts, and Notation

2.1 Schemas and Instances

A schema of a database is a collection of relational atoms, wherein each relational atom represents a table of the database and consists of a relation and a set of attributers of the relation, each relation denoting a name of a table and each attribute denoting a column of the table. The attributes of each relation is represented as tuple comprising the attributes of each relation. For example, illustrative source schema S and target schema T are as follows.

S: Emp (ssn, name, addr)
WorkedOn (ssn, pname, duration)
EmpEval (ssn, name, pname, duration, eval)
T: TEmp (eid, ssn, name)
EmpProjSummary (eid, pname, duration, eval)

In this example, the source schema S comprises relational atoms Emp (ssn, name, addr), WorkedOn (ssn, pname, duration), and EmpEval (ssn, name, pname, duration, eval). The relational atom Emp (ssn, name, addr) consists of the relation Emp having associated attributes ssn, name, and addr. The relational atom WorkedOn (ssn, pname, duration) consists of the relation WorkedOn having associated attributes ssn, pname, and duration. The relational atom EmpEval (ssn, name, pname, duration, eval) consists of the relation EmpEval having associated attributes ssn, name, pname, duration, and eval.

Similarly, the source schema S comprises relational atoms TEmp (eid, ssn, name) and EmpProjSummary (eid, pname, duration, eval). The relational atom TEmp (eid, ssn, name) consists of the relation TEmp having associated attributes eid, ssn, and name. The relational atom EmpProjSummary (eid, pname, duration, eval) consists of the relation EmpProjSummary having associated attributes eid, pname, duration, eval.

In this example, the attributes that appear in the schemas S and T represent information about employees (ssn, eid, name, addr), the projects they worked on (pname), the duration of time they worked on a project (duration), and an evaluation file received (eval) in a year for a given project.

Given a schema S consisting of relations described by relation symbols $R_1, \ldots, R_n$ (each said relation or its associated relation symbol having its respective set of attributes), a database instance (or instance) I over S is a collection of relations (or tables) $r_1, \ldots, r_n$, such that for each k from 1 to n, $r_k$ has the exactly the same attributes as the relation symbol $R_k$. As an example, FIG. 1 depicts an illustrative database instance I over the source schema S, in accordance with embodiments of the present invention.

2.2 Schema Mappings

Schema mappings are used to specify relationships between schemas. More precisely, a schema mapping between a schema S and a schema T is a formal way of asserting correspondences between instances over S and instances over T. Additionally, a schema mapping is also used as a specification of how an instance over schema S can be transformed into a corresponding instance over schema T, which will be explained infra.

It is assumed that schema mappings are given as constraints expressed in the language of source-to-target tuple-generating dependencies (tgds). Consider the following example of a schema mapping, M, between the schemas S and T. M comprises two constraints, namely $t_1$ and $t_2$, each being an s-t tgd.

$t_1$: Emp(s,n,a) ^WorkedOn (s,p,d)→∃E∃F(TEmp(E,s,n) ^EmpProjSummary (E,p,d,F))

$t_2$: EmpEval(s,n,p,d,f)→∃E(TEmp(E,s,n) ^EmpProjSummary(E,p,d,f))

A schema mapping comprises at least one constraint. Each constraint is a constraint of the schema mapping. Each constraint of the schema mapping generally comprises a mapping of the form X→Y, wherein X is a "premise" and Y is a "conclusion" of the schema mapping. The symbol ^ is a conjunction operator defined as conjoining any two relational atoms $A_1$ and $A_2$ by the expression $A_1$^$A_2$. Thus, in the constraint $t_1$, the premise is Emp(s,n,a)^ WorkedOn(s,p,d), and the conclusion is ∃E ∃F (TEmp(E,s,n)^EmpProjSummary(E,p,d,F)). In the constraint $t_2$, the premise is EmpEval(s,n,p,d,f), and the conclusion is ∃E (TEmp(E,s,n)^EmpProjSummary(E,p,d,f)).

Figure 2B:
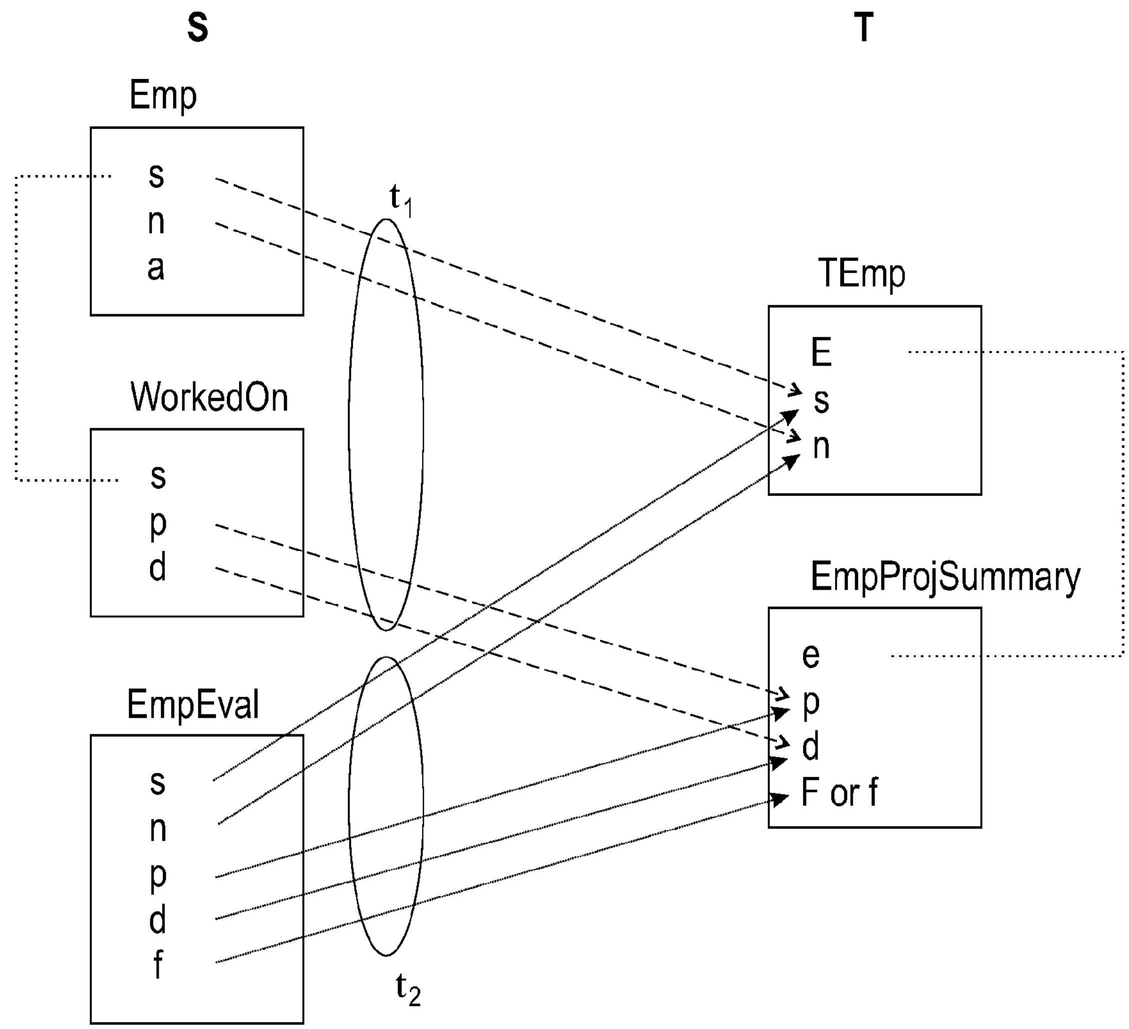

FIGS. 2A and 2B (collectively, "FIG. 2") depict a pictorial view of how the constraints $t_1$ and $t_2$ of the mapping M relate tables and associated attributes in the source schema S to tables and associated attributes in the target schema T, in accordance with embodiments of the present invention. The pictorial view of FIG. 2 shows only the attributes in relations without illustrating any of the tuples that may exist in instances.

FIG. 2B is derived from FIG. 2A by substituting the symbols of s, n, a, p, d, f, E, F for the attribute names of ssn, name, addr, pname, duration, eval, eid, eval, respectively.

In the constraints, variables (e.g., s, n, p, etc.) denote the values that may appear in each of the columns. For example, in Emp (s, n), s and n are variables to represent concrete values for ssn and name, respectively. The s-t tgd $t_1$ asserts that whenever there are two tuples in Emp and WorkedOn with the same value (denoted by s) for the ssn attribute, there exists two corresponding tuples in TEmp and EmpProjSummary. Note that s, n, p, d are "copied" to components of the target tuples: s and n are copied to TEmp; and p and d are copied to EmpProjSummary. The address field (variable a) is not copied to the target. In addition, there are several components in the target tuples that are existentially quantified (and not given by the source values). E is an existentially quantified variable as specified by ∃E, representing an eid value that must exist in both TEmp and EmpProjSummary, in order to correlate the two target tuples. Similarly, F is an existentially quantified variable as specified by ∃F, representing an "unknown" evaluation file value for the EmpProjSummary tuple that is asserted by $t_1$.

The s-t tgd $t_2$ is a similar constraint asserting that for each EmpEval tuple in the source there exists two corresponding tuples in TEmp and EmpProjSummary. In this case, s, n, p, d, f are "copied" to components of the target tuples, and E is existentially quantified.

Generally, in a system that evaluates a mapping, the existentially quantified variables must be replaced by unique values generated by the system. This must be the case for E in the above example, since eid plays the role of a key/foreign key. The values that must appear in the target and are not part of the source instances are called "nulls".

Const is used to represent the set of all possible source values, and Var is used to represent the set of all possible nulls. An instance can have values in Const∪Var which may be the case for target instances. In contrast, source instances typically have values from Const alone. Such source instances with values from Const alone are called "ground instances".

2.3 Schema Mappings: Syntax

In general, given a schema S (the source schema) and a schema T (the target schema), a source-to-target tgd (s-t tgd) is defined as a first-order constraint of the form $$\phi(x) \rightarrow \exists y \psi(x,y)$$

where φ(x) in the s-t tgd is a single relational atom in S or a conjunction of relational atoms over S, and ψ(x, y) is a single relational atom in T or a conjunction of relational atoms over T, and every variable in x occurs in a relational atom in φ(x). In the above, x represents a sequence of distinct variables and y represents a sequence of distinct variables (different from those distinct variables in x). The variables in x are universally quantified, while the variables in y are existentially quantified. A relational atom that may appear in φ is any expression of the form $R(x_1, \ldots, x_n)$, where R is some relation symbol of the source schema S, and $x_1, \ldots, x_n$ are variables (not necessarily distinct) that appear in x and denote the values for the attributes of R. Similarly, a relational atom that may appear in ψ is any expression of the form $P(z_1, \ldots, z_k)$, where P is some relation symbol of T, and $z_1, \ldots, z_k$ are variables (not necessarily distinct) that appear in x or y and denote values for the attributes of P.

A schema mapping M from S to T is a set of source-to-target tgds. In addition to source-to-target tgds, the present invention utilizes disjunctive tgds with constants and inequalities, which are used to represent the "reverse" schema mappings from T to S that are computed by Algorithm A of the present invention.

Given the source schema S and the target schema T, a disjunctive tgd (from T to S) with constants and inequalities is defined as a first-order constraint of the form:

$$\phi(x) \rightarrow \exists y_1 \psi_1(x,y_1))$$
$$\vee \exists y_2 \psi_2(x,y_2))$$
$$\ldots$$
$$\vee \exists y_n \psi_n(x,y_n))$$

wherein n is at least 2, and wherein the formula φ(x) in the disjunctive tgd is a conjunction of:

(1) relational atoms over T, such that every variable in x occurs in one of the relational atoms in φ(x);

(2) formulas of the form Constant(x), where x is a variable in x; and (3) inequalities $x \neq x'$, where x and x' are variables in x.

Each formula $\psi_i(x, y_i)$, with i=1, . . . , n, is a conjunction of relational atoms over S. A formula Constant(x) evaluates to true if and only if x is interpreted by a value in Const.

Note that if n=1, the above tgd is not disjunctive.

A disjunctive tgd with constants and inequalities among constants is a special case of a disjunctive tgd with inequalities and constants where the formulas Constant(x) and Constant(x') occur as conjuncts of $\phi(x)$ whenever the inequality $x \neq x'$ is a conjunct of $\phi(x)$.

Given the preceding illustrative schemas S and T, note the following example of a disjunctive tgd (from T to S) with constants and inequalities among constants:

$$\text{TEmp}(e,s,n) \wedge \text{EmpProjSummary}(e,p,d,f) \wedge \text{Constant}(s) \wedge \text{Constant}(n) \wedge \text{Constant}(p) \wedge \text{Constant}(d) \wedge (n \neq p) \rightarrow \exists A(\text{Emp}(s,n,A) \wedge \text{WorkedOn}(s,p,d)) \vee \exists F(\text{EmpEval}(s,n,p,d,F)) \quad (d)$$

2.4 Schema Mappings: Semantics, Composition, and Inversion

Schema mappings can be viewed as describing relationships between instances over two schemas. Under this view, the formulas that appear in a schema mapping are considered as inter-schema constraints. Given a schema mapping M between a schema $S_1$ and a schema $S_2$, the following binary relation Inst (M) is defined as follows.

$$\text{Inst}(M)=\{(I,J)|I \text{ is an instance over } S_1, J \text{ is an instance over } S_2, \text{ and } (I,J) \text{ satisfies } M\} \quad (1)$$

The binary relation Inst (M) comprises all the "valid" pairs of instances, where "valid" means pairs of instances that satisfy all the constraints that appear in M. As an example, FIG. 3 illustrates database instances I and J such that the pair (I, J) satisfies the schema mapping M of FIG. 2, in accordance with embodiments of the present invention. The mapping M comprises the two s-t tgds $t_1$ and $t_2$ described supra.

Note that the target instance J contains all the tuples that are required to exist according to the constraints imposed by the two s-t tgds $t_1$ and $t_2$, given the source instance I. Thus, the pair (I, J) is in Inst (M), and Inst(M) consists of all such pairs (I, J). In other words, given a schema mapping M from $S_1$ to $S_2$ and given an instance I over $S_1$, there may be multiple instances J over $S_2$ such that (I, J) satisfies M. For the example instance I in FIG. 3, and for the earlier schema mapping M, there are multiple ways of filling the target instance with tuples (e.g., using other null values instead of $E_1$ and $E_2$) that still satisfy the constraints of the schema mapping. The term "solution" refers to each such possible instance J.

The following set Sol(M, I) is defined as follows to represent all possible solutions for a given schema mapping M from $S_1$ and $S_2$ and a given instance I over $S_1$:

$$\text{Sol}(M,I)=\{J|J \text{ instance over } S_2, (I,J) \text{ satisfies } M\} \quad (2)$$

Sol(M, I) represents the data exchange semantics of a schema mapping M with respect to I, since Sol(M, J) encodes the set of all possible target instances that are consistent with M and I.

2.5 Composition

Given two schema mappings $M_{12}$, from schema $S_1$ to schema $S_2$, and $M_{23}$ from schema $S_2$ to another schema $S_3$, the composition Inst $(M_{12})$·Inst $(M_{23})$ is defined, in the usual mathematical sense, as the composition of the two binary relations Inst $(M_{12})$ and Inst $(M_{23})$:

$$\text{Inst}(M_{12})\cdot\text{Inst}(M_{23})=\{(I_1,I_3)|I_1 \text{ is an instance over } S_1, I_2 \text{ is an instance over } S_2, \text{ and there is an instance } I_2 \text{ over } S_2 \text{ such that } (I_1,I_2) \text{ satisfies } M_{12} \text{ and } (I_2,I_3) \text{ satisfies } M_{23}\} \quad (3)$$

Then, by definition, a schema mapping $M_{13}$ defines the composition of schema mappings $M_{12}$ and $M_{23}$ if the following equation is satisfied:

$$\text{Inst}(M_{13})=\text{Inst}(M_{12})\cdot\text{Inst}(M_{23}) \quad (4)$$

The previous notion of composition is defined in a general way, where the schemas $S_1$, $S_2$ and $S_3$ are arbitrary schemas. Next, attention is focused on schema mappings from a source schema S to a target schema T and on their inverses (that is, schema mappings from T to S).

2.6 Inverse

Let S' be a replica of the source schema S such that for every relation symbol R of S, the schema S' contains a relation symbol R' that is not in S and has the same set of attributes as R. Thus, S' is an identical copy of the schema S.

The identity schema mapping is, by definition, a schema mapping Id from S to S', where Id consists of all the dependencies $R(x) \rightarrow R'(x)$ as R ranges over all the relation symbols in S. In other words, Id is a set of "copy" constraints from S to S' that require all the tuples in a source instance over S appear in a replica instance over S'. Thus, Inst(Id) consists of all pairs $(I_1, I_2)$ of a ground instance $I_1$ over S and a ground instance $I_2$ over S' such that $I_1 \subseteq I_2$.

A schema mapping M' from T to S is an inverse of a schema mapping M from S to T if Inst(Id)=Inst(M) o Inst(M') (see Ronald Fagin, Inverting Schema Mappings. PODS 2006, pages 50-59). In other words, the identity schema mapping Id equals the composition of the schema mappings M and M'. This bears some analogy to the usual mathematical definition of an inverse function, namely composing a function with its inverse must equal the identity function.

The present invention describes a quasi-inverse of a schema mapping that is a relaxation of the existing definition of an inverse, together with Algorithm A for computing the quasi-inverse of a schema mapping and Algorithm B for using quasi-inverses for bidirectional data exchange.

3. Quasi-Inverses of Schema Mappings

The notion of a quasi-inverse is obtained from the notion of an inverse by not differentiating between ground instances that are equivalent for data-exchange purposes. In more formal terms, consider the equivalence relation ~ between ground instances such that $I_1 \sim I_2$ holds if $I_1$ and $I_2$ have the same space of solutions; i.e., if Sol(M, $I_1$)=Sol(M, $I_2$). Whenever $I_1 \sim I_2$, $I_1$ and $I_2$ are said to be data exchange equivalent.

By definition, a schema mapping M' from T to S is a quasi-inverse of a schema mapping M from S to T if Inst(M) o Inst(M')=Inst(Id) modulo the equivalence relation ~, which means that for every pair $(I_1, I_2)$ of ground instances the following properties (1) and (2) hold:

(1) If $(I_1, I_2)$ is in Inst(M) o Inst(M'), then there must be instances $I_1'$ and $I_2'$ such that $(I_1', I_2')$ is in Inst (Id) and $I_1 \sim I_1'$ and $I_2 \sim I_2'$;

(2) If $(I_1, I_2)$ is in Inst(Id), then there must be instances $I_1'$ and $I_2'$ such that $(I_1', I_2')$ is in Inst (M) o Inst(M') and $I_1 \sim I_1'$ and $I_2 \sim I_2'$.

Property (1) recites that if ($I_1$, $I_2$) is in Inst(M) o Inst(M') then, although ($I_1$, $I_2$) does not have to be in Inst (Id), some data exchange equivalent instances $I_1$' and $I_2$' satisfy that ($I_1$', $I_2$') is in Inst(Id). In other words, if $I_2$ is a result (solution) of M o M' with respect to $I_1$, then $I_2$ is data exchange equivalent to some $I_2$' that is a result (solution) of Id with respect to some instance $I_1$' that is data exchange equivalent to $I_1$. Thus, the composition M o M' has the same data exchange behavior as the identity mapping Id, as long as differences between data exchange equivalent instances are not taken into consideration. A similar explanation holds for Property (2).

This relaxation of the notion of an inverse for the quasi-inverse is quite useful in practice, because there are many practical examples where inverses do not exist but quasi-inverses do exist. Furthermore, although quasi-inverses do not fully recover a source instance, quasi-inverses can be used to recover an instance that is equivalent for data exchange purposes (see Algorithm B, described infra). Thus, quasi-inverses can be seen as approximations of inverses and are useful when inverses do not exist. If an inverse mapping exists, the mapping is said to be invertible.

Figure 4:
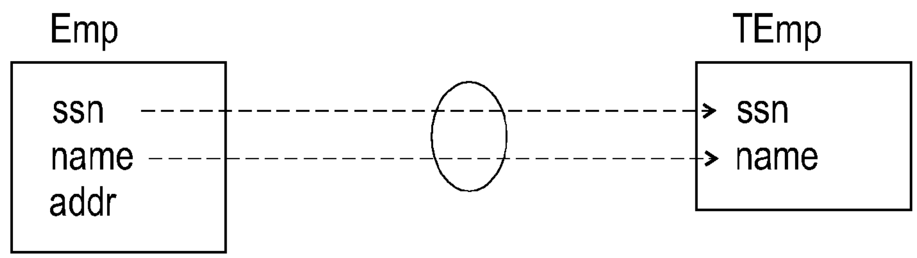
FIGS. 4 and 5 illustrate examples of schema mappings that are not invertible but are quasi-invertible, in accordance with embodiments of the present invention.
Figure 5:
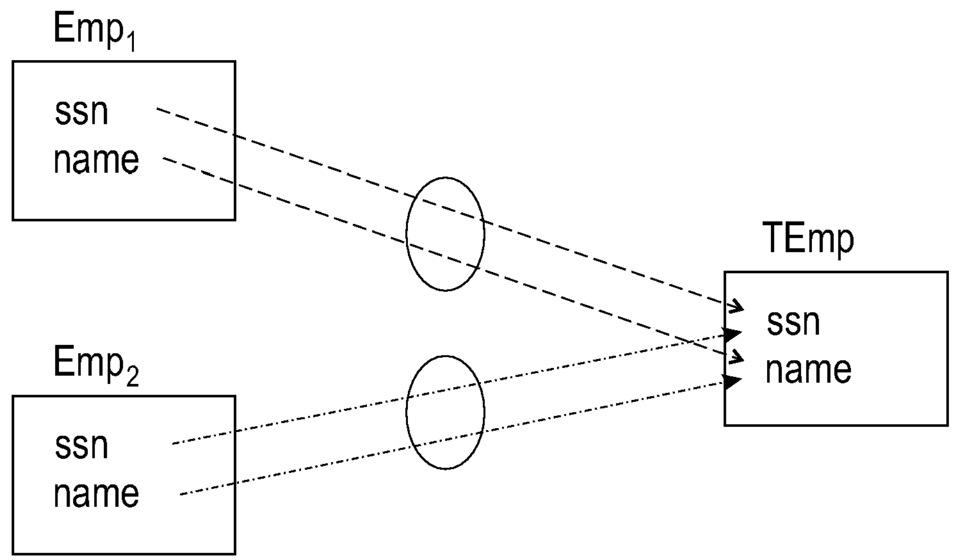

Quasi-inverses have larger applicability than inverses. FIGS. 4 and 5 illustrate examples of schema mappings that are not invertible but are quasi-invertible, in accordance with embodiments of the present invention.

FIG. 4 describes a projection mapping that copies all of the source information to the target with the exception of one attribute (addr). The projection mapping is not invertible because it is not possible to recover the source instance once the data is moved to the target, because the attribute (addr) cannot be recovered. However, the projection mapping is quasi-invertible, and the schema mapping M' shown in the FIG. 4 is a quasi-inverse. Although M' cannot fully recover a source instance, M' can recover the best source instance that is possible, that is, a source instance in which the addr attribute will remain unknown. Such aq source instance is still useful, since this source instance contains all the data that has been exported to the target which is the best that can be done.

FIG. 5 describes a union mapping that generates a union of employee data from two different source tables ($EMP_1$ and $EMP_2$) into one target table (TEmp). This union mapping is not invertible because it is not possible to recover the source instance once the data is moved to the target. In particular, if the same employee is stored in both source tables, it cannot be determined which table the same employee came from once the data is moved to the target table TEmp. Nevertheless, the union mapping is quasi-invertible and the schema mapping M' shown in the figure is a quasi-inverse. As with the projection example of FIG. 4, the quasi-inverse M' can be used to reverse the data exchange process. In this case, the reverse data exchange produces a set of possible source instances, since M' has disjunction, and for each target tuple there is a choice of moving it either to the first table or to the second table. However, each of these possible source instances contains all the exported data. In particular, applying the mapping M again will generate the same target data.

The examples of FIGS. 4 and 5 show larger applicability of the concept of quasi-inverse than that of the concept of inverse. In particular, quasi-inverses can be applied for reverse data exchange to recover all the data that was exported by the original schema mapping even when the original schema mapping is not invertible. A method for computing a quasi-inverse may be implemented by Algorithm A. A method for performing reverse data exchange method may be implemented by Algorithm B.

4. Algorithm A (Quasi-Inverse)

The input to Algorithm A comprises a schema mapping M from S to T, expressed as a set of source-to-target tgds (e.g., the schema mapping M={$t_1$, $t_2$}, described supra).

The output from Algorithm A comprises a schema mapping M from T to S, expressed as a set of disjunctive tgds with constants and inequalities among the constants, which represents a quasi-inverse of M if such quasi-inverse exists.

Figures 6A, 6B, 6C:
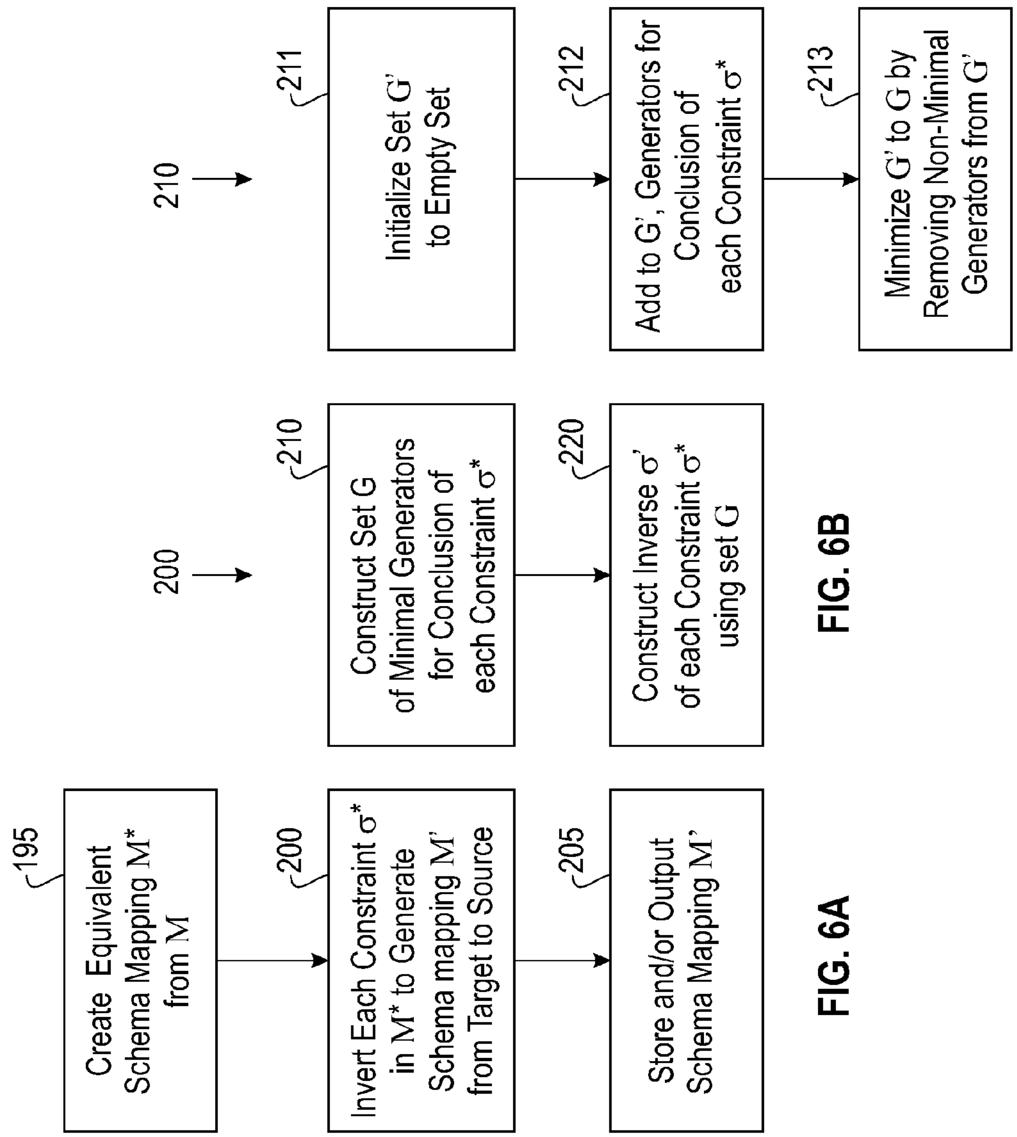
FIGS. 6A, 6B, and 6C are flow charts describing Algorithm A, in accordance with embodiments of the present invention.

FIGS. 6A, 6B, and 6C (collectively, "FIG. 6") are flow charts describing Algorithm A, in accordance with embodiments of the present invention.

FIG. 6A is a high level flow chart comprising steps 195, 200, and 205.

Step 195 of FIG. 6A creates an equivalent schema mapping M* that considers all possible equality patterns of M. Each member (i.e., constraint) σ of M is a constraint represented as a s-t tgd (e.g., the example s-t tgds $t_1$ and $t_2$ discussed supra). For each member σ of M, let x be the set of all variables that appear in both the premise and the conclusion of σ. Note that σ can be written as $\phi(x, z) \rightarrow \exists y\ \psi(x, y)$ where z represents all the variables that appear in φ but not in ψ, and x represents all the variables that appear in both φ and ψ. An equality pattern on x is a conjunction C of equalities among members of x with the requirement that each equality $x_i = x_j$ in C must be well-typed (i.e., $x_i$ and $x_j$ are of the same type, that is, string, or integer, etc). For each such well-typed equality pattern C, a constraint σ" is obtained from σ by forming a conjunction of C and σ. The schema mapping M* is obtained by forming the union of M with all such σ". The resulting constraints in M* are denoted as σ* which consists of σ and σ".

For example, consider the earlier schema mapping M={$t_1$, $t_2$}. In the case of $t_1$, the set of variables that appears in both the premise and the conclusion is {s, n, p, d}. It is assumed, for illustration purposes, that n and p have the same type ("string"), s is of type "integer", and d is of type "duration". Then, the only non-empty equality pattern C on {s, n, p, d} that is well-typed is the equality "n=p". Thus, the following constraint $t_1$' is generated in step 195:

$t_1$': Emp(s,n,a) ^WorkedOn (s,n,d)→∃E∃F(TEmp(E,s,n) ^EmpProjSummary (E,n,d,F))

Constraints such as $t_1$' are considered by the algorithm in order to account for all combinations of values in the target, including any accidental matching of values. In this example, the employee name in a TEmp tuple may match the project name in an EmpProjSummary if such match is coming from the source database.

For the second s-t tgd $t_2$ in M, the set of variables that appears in both the premise and the conclusion is {s, n, p, d, f}. It is assumed, for illustration purposes, that n and p have the same type ("string"), s is of type "integer", and d is of type "duration". Furthermore, it is assumed that f is of a type "file". Then, the only non-empty equality pattern C on {s, n, p, d, f} that is well-typed is the equality "n=p". Thus, the following constraint $t_2$' is also generated in step 195:

$t_2$': EmpEval(s,n,n,d,f)→∃E(TEmp(E,s,n) ^EmpProj-Summary(E,n,d,f)

The schema mapping M* that results at the end of step 195, for this example, is M*={$t_1$, $t_2$, $t_1$', $t_2$'}.

Step 200 of FIG. 6A inverts each constraint σ* of M* to generate the schema mapping M from T to S. Let $\sigma^* = \phi(x, z) \rightarrow \exists y\ \psi(x, y)$ be a constraint in M*. The variables in x are universally quantified, while the variables in y are existentially quantified. As in step 195, x is the set of variables that appears in both φ and ψ. In the example, the constraints σ* determined in step 195 to be $t_1$, $t_2$, $t_1'$, $t_2'$ are each inverted in step 200. As an example of such constraint σ* to be inverted, consider $t_1$:

$$Emp(s,n,a) \wedge WorkedOn(s,p,d) \rightarrow \exists E \exists F(TEmp(E,s,n) \wedge EmpProjSummary(E,p,d,F))$$

Figure 9:
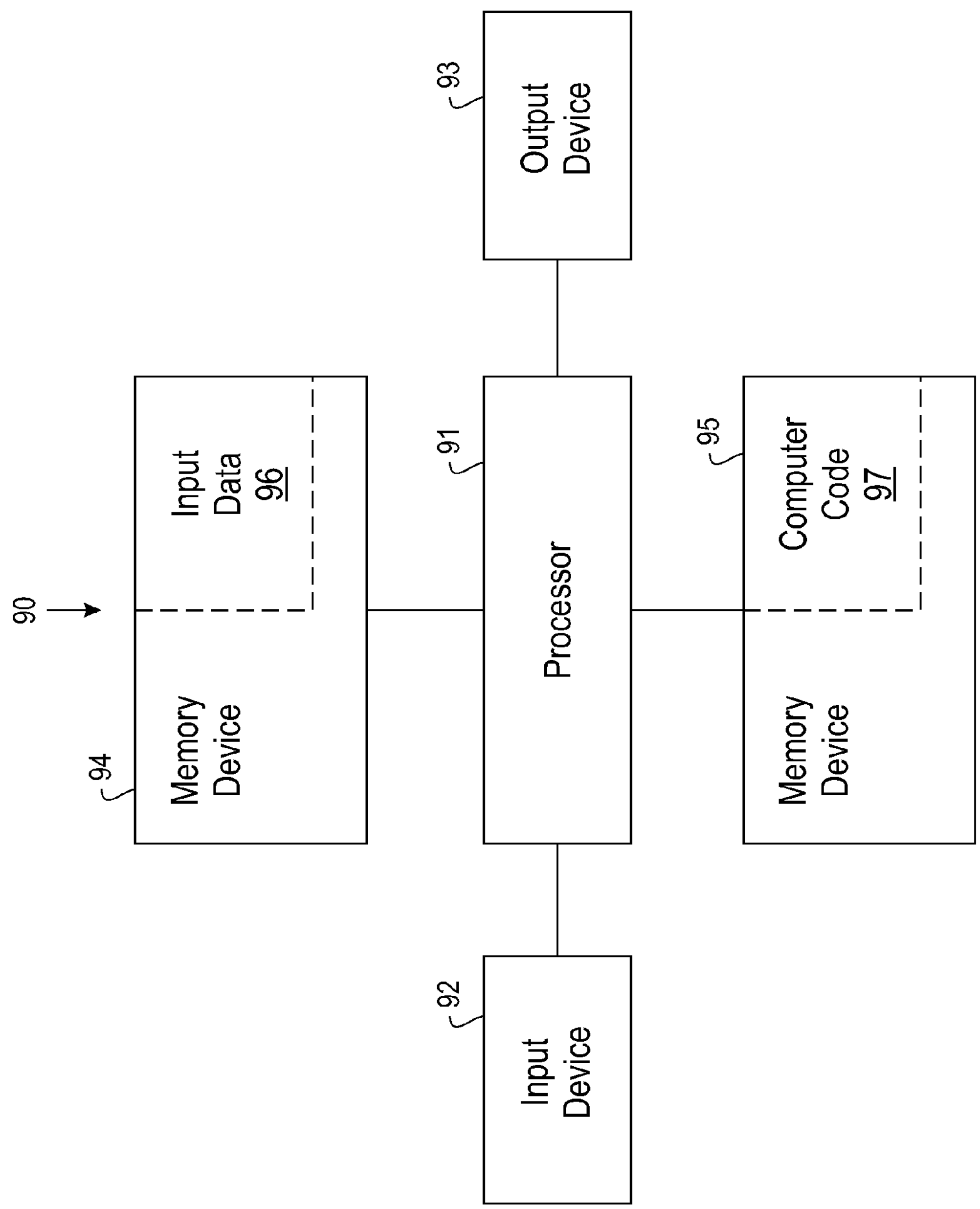
FIG. 9 illustrates a computer system used for executing software to implement the methodology of the present invention.

Step 205 of FIG. 6A stores the schema mapping M' in at least one computer usable storage device of the computer system 90 of FIG. 9 and/or outputs the schema mapping M' in at least one output device of the computer system 90 of FIG. 9.

FIG. 6B describes step 200 of FIG. 6A in more detail for each constraint σ* in M*. FIG. 6B comprises steps 210 and 220.

Step 210 of FIG. 6B constructs a set G of minimal generators (i.e., a minimum number of generators in the set G) for the conclusion ∃y ψ(x, y) of each constraint σ* of M*. For the preceding example $t_1$, it is necessary to construct the set of minimal generators for the conclusion of $t_1$, said conclusion of $t_1$ being:

$$\exists E \exists F(TEmp(E,s,n) \wedge EmpProjSummary(E,p,d,F)) \quad (5)$$

In the example, x={s, n, p, d} and y={E, F}, wherein the variables s, n, p, d in x are universally quantified and the variables E, F in y are existentially quantified.

The minimal generators are defined as follows. Let β(x, z) be a conjunction of relational atoms over the source schema S, and let ψ(x, y) be a conjunction of relational atoms over the target schema T, where x, y, z are sets of distinct variables, and the members of x are exactly the variables that appear in both β(x, z) and ψ(x, y). β(x, z) is defined to be a generator of ∃y ψ(x, y) if the s-t tgd β(x, z)→∃y ψ(x, y) is logically implied by the s-t tgds in M. Moreover, β(x, z) is a minimal generator of ∃y ψ(x, y) if β(x, z) is a generator of ∃y ψ(x, y) and there is no β'(x, z') that is a conjunction of a strict subset of the relational atoms in β(x, z) such that β'(x, z') is a generator of ∃y ψ(x, y).

It is known from the standard relational theory of dependencies that logical implication of tgds can be checked by using the chase method (see David Maier, Alberto O. Mendelzon, Yehoshua Sagiv, Testing Implications of Data Dependencies, ACM Trans. Database Syst. 4(4): 455-469 (1979)). To check whether β(x, z)→∃y ψ(x, y) is logically implied by the s-t tgds in M, it is determined whether the chase of β(x, z) with the s-t tgds in M gives the relational atoms in ψ(x, y') for a substitution of y by y'. An example of how the chase is applied will be provided infra. The terminology "chasing Z" means "applying a chase to Z", wherein Z denotes an entity (e.g., an instance) to which the chase is applied.

FIG. 6C describes step 210 of FIG. 6B for computing the set of all the minimal generators for ∃y ψ(x, y). FIG. 6C comprises steps 211, 212, and 213.

Step 211 of FIG. 6C initializes a set G' to an empty set.

Step 212 of FIG. 6C adds to the empty set G' a set of generators to transform the empty set G' to a set of generators consisting of β(x, z). In step 212, let $s_1$ be the maximum number of relational atoms that can appear in the premise of a constraint σ* (i.e., an s-t tgd) in M*. Let $s_2$ be the number of relational atoms in the conclusion of σ* which comprises ψ(x, y). Step 212 systematically checks every well-formed conjunction β(x, z) (up to renaming of the variables in z) of at most the $s_1 s_2$ combinations of the $s_1$ relational atoms in the premise and the $s_2$ relational atoms in the conclusion comprising ψ(x, y), where the variables in z are all distinct and different from x and y, to determine whether ("yes") or not ("no") forming the chase of β(x, z) with the s-t tgds in M* gives the relational atoms in ψ(x, y') for a substitution of y by y'. If "yes", then β(x, z) is added to G. If "no", then β(x, z) is not added to G'.

As an example, consider the earlier formula (5). It can be verified that $s_1$=2, since the maximum number of relational atoms in the premise of the s-t tgds in M is 2. Also, it can be verified that $s_2$=2, since there are two relational atoms in the formula (5). Thus, there is a need to consider all combinations β(x, z) with at most 4 relational atoms over the source schema S, where x={s, n, p, d}. The following are two such combinations (in general there are an exponential number of distinct combinations) are:

$$Emp(s,n,a) \wedge WorkedOn(s,p,d) \quad (6)$$

$$Emp(s,n,a) \wedge WorkedOn(s',p,d) \quad (7)$$

$$Emp(s,n,a) \wedge WorkedOn(s',p,d) \wedge EmpEval(s,n,p,d,f) \quad (8)$$

The formula (6) is an example of β(x, z) with two relational atoms where x={s, n, p, d} and where z={a}. By chasing formula (6) (i.e., applying a chase to formula (6)) with the first tgd ($t_1$) in M, the two relational atoms are obtained in the conclusion of $t_1$, said conclusion of $t_1$ being TEmp(E,s,n) ^EmpProjSummary(E,p,d,F). Said conclusion of $t_1$ comprises precisely the relational atoms in formula (5). Thus, formula (6) is a generator for formula (5).

Formula (7) is another example of β(x, z) with two relational atoms where x={s, n, p, d}, but where z={a, s'}. It can be verified that no chase steps with the tgds in M apply (for example, the tgd $t_1$ only applies if Emp and WorkedOn join on the first field, which is not the case, since s and s' are distinct variables.). Thus, formula (7) is not a generator for formula (5).

Formula (8) is yet another example of β(x, z), this time, with three relational atoms, where x={s, n, p, d} and where z={a, s', f}. By chasing formula (8) with the second tgd ($t_2$) in M, the two relational atoms are obtained in the conclusion of $t_1$, said conclusion of $t_1$ being TEmp(E,s,n)^EmpProjSummary(E,p,d,F) where F is substituted by f. Thus, formula (8) is another generator for formula (5).

In step 213 of FIG. 6C, the generators in G' are minimized. For each member β(x, z) of G', it is determined whether ("yes") or not ("no") there is some other β'(x, z') in G' whose relational atoms form a strict subset of the generator relational atoms of β(x, z) (up to renaming of the variables in z, z'). If "yes", then β(x, z) is removed from G', since it is not minimal. The process is continued until there is no more change to G'.

In other words, step 213 performs a generator removal process comprising removing from G' each generator determined to not be a minimal generator satisfying a condition of non-existence of any generator that is a conjunction of a strict subset of the relational atoms in the minimal generator. The preceding generator removal process in step 213 results in G' becoming the set G of minimal generators.

As an example, the formula (8) above is not a minimal generator. There is another formula:

$$EmpEval(s,n,p,d,f) \quad (9)$$

that is a generator for (5). Furthermore, the relational atoms in (9) form a strict subset of the relational atoms in (8) and, hence, (8) is not a minimal generator. In contrast, (9) is a minimal generator.

At this point, G contains the set of all minimal generators for ∃y ψ(x, y) and execution of step 210 is finished. For this example, the minimal generators for formula (5) are the two formulas (6) and (9).

Step 220 of FIG. 6B constructs the "inverse" σ' of each constraint σ*. Given $\sigma^*=\phi(x, z)\rightarrow\exists y\ \psi(x, y)$, σ' is constructed as follows. The premise of σ' is the conjunction of ψ(x, y), along with each of the formulas Constant(x) for members x of x, and along with inequalities of the form $x_i \neq x_j$; for each pair $x_i$ and $x_j$ of variables in x that have the same type. The conclusion of σ' is constructed as the disjunction of all the formulas of the form ∃zβ(x, z), where β(x, z) ranges over the set of minimal generators constructed in step 210 of FIG. 6B.

As an example, for the earlier s-t tgd $t_1$, the following disjunctive tgd with inequalities and constants among inequalities is created:

$$\text{TEmp}(e,s,n) \wedge \text{EmpProjSummary}(e,p,d,f) \wedge \text{Constant}(s) \wedge \text{Constant}(n) \wedge \text{Constant}(p) \wedge \text{Constant}(d) \wedge (n \neq p) \rightarrow \exists A(\text{Emp}(s,n,A) \wedge \text{WorkedOn}(s,p,d)) \vee \exists F(\text{EmpEval}(s,n,p,d,F)) \quad (d)$$

Note the Constant predicate added for each variable in x={s, n, p, d} and also the inequality between the two variables n and p that have the same type. The two minimal generators (formulas (6) and (9) computed in step 212 and 213, respectively) have been added as terms in the disjunction. Note that the variables that appear in the minimal generators, but are not part of x, are existentially quantified (e.g., E and F).

The algorithm terminates with the set of all constraints σ' (one for each constraints σ* of M*).

The set M' of all such constraints σ' (each a disjunctive tgd with constants and inequalities among constants) describes a "reverse" relationship between instances over T and instances over S that is implied by the input schema mapping M. It is noted that there are cases where the schema mapping may not have any quasi-inverses. In such cases, the result M' of the algorithm A is not a quasi-inverse (although M' can still be used with Algorithm B). However, in the more common case when M is quasi-invertible, Algorithm A is guaranteed to produce a schema mapping M' that is a quasi-inverse of M.

5. Additional Concepts for Algorithm B 5.1 Data Exchange With Chase.

In addition to describing a relationship, a schema mapping can be viewed as describing a process (data movement) in which a canonical target instance is materialized, given a source instance I and the schema mapping. This process is called data exchange. If M is a schema mapping from S to T that is expressed as a set of s-t tgds, the chase method can be used to compute a canonical target instance $J_C$ over T, when given a source instance I over S. The chase method is a classical method in relational database theory see (David Maier, Alberto O. Mendelzon, Yehoshua Sagiv, Testing Implications of Data Dependencies. ACM Trans. Database Syst. 4(4): 455-469 (1979)). The present invention uses a variation of the chase that applies on instances instead of constraints. This chase is next described.

At the beginning of the chase, the target instance $J_C$ is empty. Then, for each s-t tgd t in M, and for each instantiation of the relational atoms in the premise to concrete tuples in the source instance I, the chase adds corresponding tuples to the target instance $J_C$ such that the conclusion of t is satisfied. Any existentially quantified variables that appear in the conclusion of the constraint are replaced by fresh new nulls in the actual tuples that are added in the target. These nulls are distinct from any of the source values and different from any earlier nulls. The process is repeated until all the constraints in M are satisfied.

Figure 7A:
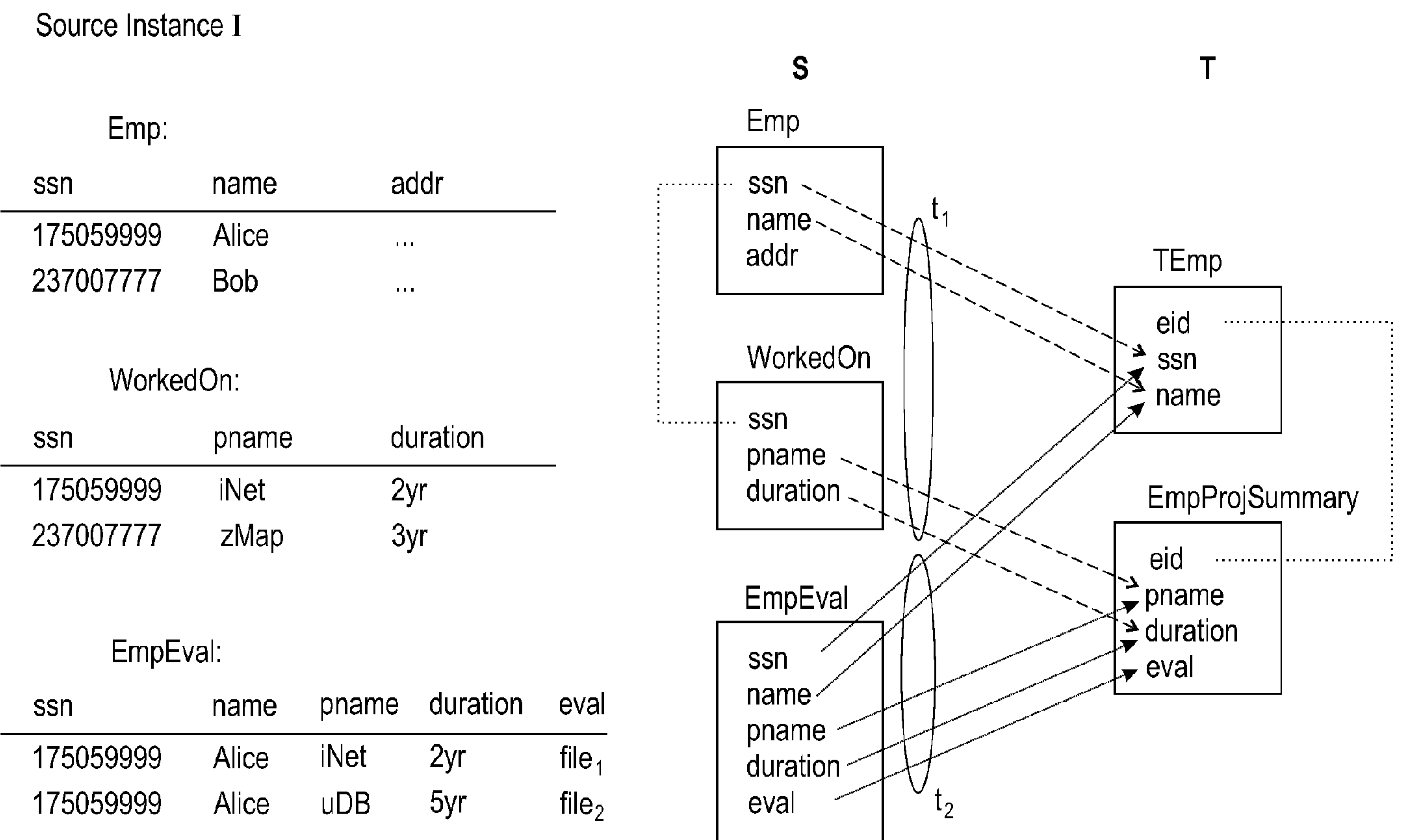
FIGS. 7A and 7B depict the source instance I of FIG. 1 over the schema S and the chase of instance I, in accordance with embodiments of the present invention.
Figure 7B:
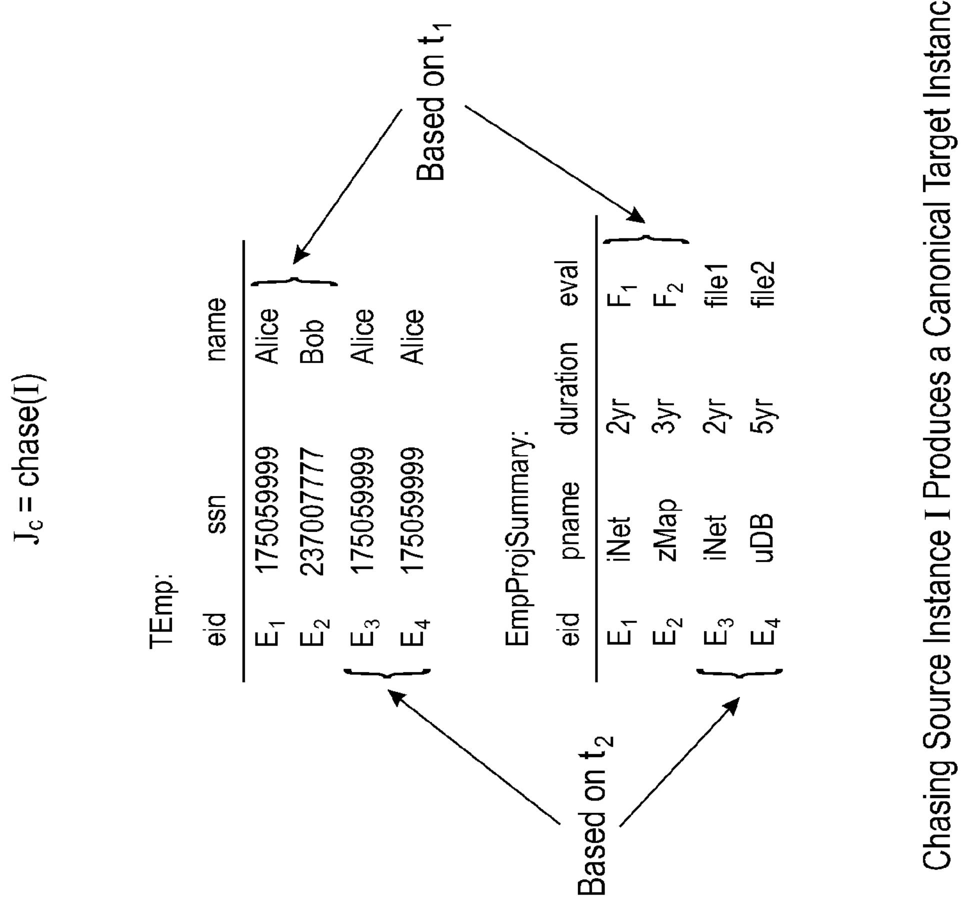

FIGS. 7A and 7B (collectively, "FIG. 7") depict the source instance I of FIG. 1 over the schema S and the chase of instance I, in accordance with embodiments of the present invention.

As an example, FIG. 7A depicts the source instance I of FIG. 1 over the schema S and the chase of instance I, in accordance with embodiments of the present invention. FIGS. 7A and 7B show pictorially how the chase with the schema mapping $M=\{t_1, t_2\}$ generates a canonical target instance $J_C$. The chase works as follows. The two relational atoms in the premise (i.e., left-hand side) of the constraint $t_1$ can be instantiated in two ways with tuples from I.

First, the two relational atoms in the left-hand side of $t_1$ can be instantiated with the first Emp tuple, [175059999, Alice, 100 Clover Pl.] and the first WorkedOn tuple, [175059999, iNet, 2 yr]. Then, to satisfy the right-hand side of $t_1$, two target tuples must be created in TEmp and EmpProjSummary (the first rows in the two target tables of FIG. 7A). The values for ssn, name, pname, and duration are copied from the source. However, a new fresh null (denoted by $E_1$ in the figure) must be created for the eid field in both tuples. Also, a new fresh null (denoted $F_1$) must be created for the existentially quantified variable F.

The process continues with the next instantiation of the left-hand relational atoms of $t_1$: the second tuple in Emp and the second tuple in WorkedOn. Two more tuples are added to the target. At this point, the constraint $t_1$ is satisfied, and the chase continues with $t_2$. Two more target tuples are added in each of TEmp and EmpProjSummary. The chase finishes with the target instance $J_C$ shown in FIG. 7B.

5.2 Disjunctive Chase For Reverse Data Exchange.

A similar chase process can be applied for the reverse data exchange, in order to migrate the target data back to the source schema, based on a quasi-inverse mapping. In such case, the chase must be extended to handle disjunctive tgds with constants and inequalities among constants, since the constraints in a quasi-inverse mapping are of this form (see Algorithm A). The main difference from the previously described chase is that now the chase may end up with a set of possible source instances. This is due to the fact that constraints have disjunction.

The disjunctive chase works from a target instance and constructs a set of source instances, as follows. As with the normal chase, for each instantiation of the relational atoms in the left-hand side of a constraint, tuples must be added to satisfy the conclusion of the constraint. However, because of disjunction, there are actually several choices: tuples can be added to satisfy any one of the terms in the disjunction (see the earlier constraint (d) for an example where there are two choices). The disjunctive chase considers all possible choices, by constructing alternative source instances, where each satisfies one of the choices. This process repeats with each of the resulting source instances, for the remaining instantiations and constraints that are not yet satisfied. In particular, each resulting source instance can subsequently branch in further alternative instances. The final result of the disjunctive chase is a set of source instances, where each source instance satisfies the constraints of the quasi-inverse mapping.

5.3 Homomorphic Equivalence

In general, target instances that are computed from source instances based on schema mappings are incomplete. The target instances may contain nulls (e.g., $E_1$, $E_2$, $F_2$ in the target instance J shown in FIG. 3). Two target instances may be equivalent in the sense that they have the same information but use different nulls. For example, a target instance J' that has the same tuples as the target instance J in FIG. 3 but uses different nulls (for example, $ID_1$, $ID_2$ and $X_2$, instead of $E_1$, $E_2$ and $F_2$) should not be considered different. In general, the notion of equivalence between target instances that contain nulls is defined by using homomorphisms.

By definition, a homomorphism from a target instance J to a target instance J' is a function h from the values of J to the values of J' such that: (1) h(c)=c, for every source (i.e., non null) value c, and (2) for every tuple $(v_1, \ldots, v_m)$ that appears in some relation R of J, a corresponding tuple $(h(v_1), \ldots, h(v_m))$ must appear in the relation R of J'. Two target instances J and J' are homomorphically equivalent if there exist two homomorphisms; i.e., one homomorphism from J to J' and another homomorphism from J' to J.

As an example, the two instances J and J' discussed supra (where J' uses $ID_1$, $ID_2$, and $X_2$, instead of $E_1$, $E_2$ and $F_2$) are homomorphically equivalent.

By definition, two source instances I and I' have the same data exchange properties with respect to M, if the canonical target instance Jc obtained from 1 and M is homomorphically equivalent to the canonical target instance Jc' obtained from I' and M.

Note that for bidirectional data exchange between two schemas S and T, recovering a source instance I' that has the same data exchange properties as I is good enough since when data exchange is applied again, no difference will be seen (whether starting is from the original source instance I or from I').

6. Algorithm B (Data Exchange)

Algorithm B shows how to recover a source instance in a reverse data exchange by using the schema mapping that is obtained by Algorithm A. In particular, if a source instance I is transformed into a canonical target instance Jc based on a schema mapping M, Algorithm B can use a quasi-inverse M' to recover a source instance I' that has the same data exchange properties as I.

The input to Algorithm B comprises: (1) a schema mapping M from S to T, expressed as a set of source-to-target tgds (e.g., the schema mapping $M=\{t_1, t_2\}$, described supra); (2) a schema mapping M' that is the result of Algorithm A (on input M), expressed as disjunctive tgds with constants and inequalities among constants; and (3) source instance I over S.

The output from Algorithm B comprises source instance I' that has the same data exchange properties as I, with respect to M.

FIGS. 6A, 6B, and 6C (collectively, "FIG. 6") are flow charts describing Algorithm A, in accordance with embodiments of the present invention.

FIG. 6A is a high level flow chart comprising steps 195, 200, and 205

FIGS. 8A and 8B (collectively, "FIG. 8") are flow charts describing Algorithm B, in accordance with embodiments of the present invention.

FIG. 8A comprises steps 310, 320, and 330.

Step 310 of FIG. 8A generates a canonical target instance Jc from a source instance I over the source schema S by applying a chase to the source instance I with respect to the constraints σ in the schema mapping M.

Step 320 of FIG. 8A creates at least one source instance from the canonical target instance Jc such that each created source instance has the same data exchange properties as the source instance I.

Step 330 of FIG. 8A stores the created at least one source instance in at least one computer usable storage device of the computer system 90 of FIG. 9 and/or outputs the created at least one source instance in at least one output device of the computer system 90 of FIG. 9.

FIG. 8B describes in detail step 320 of FIG. 8A and comprises steps 321-323.

Step 321 of FIG. 8B generates n source instances $(I_1, \ldots, I_n)$ from Jc by applying a disjunctive chase to Jc with respect to the constraints σ' in M', wherein n is at least 2.

Step 322 of FIG. 8B generates a canonical target instance $Jc_k'$ by applying a chase to source instance $I_k$ with respect to the constraints σ in M (k=1, . . . , n).

Step 323 of FIG. 8B eliminates from the n source instances each source instance $I_k$ satisfying a condition of $Jc_k'$ not being homomorphically equivalent to Jc (k=1, . . . , n), which reduces the n source instances to the at least one source instance having the same data exchange properties as the source instance I.

Algorithm B is guaranteed to find some instance $I_k$ for which step 303. will succeed, provided that the schema mapping M' that is used for reverse data exchange is the one produced by Algorithm A (for proof, see Ronald Fagin, Phokion G. Kolaitis, Lucian Popa, Wang-Chiew Tan. Quasi-Inverses of Schema Mappings. PODS 2007, pages 123-132). Note that M' is a quasi-inverse of M in the case when M is quasi-invertible. However, Algorithms A and B are applicable even in the case when M is not quasi-invertible. Thus, the schema mapping M' obtained by algorithm A is always applicable in Algorithm B to recover a source instance with the same data exchange properties.

7. Computer System

FIG. 9 illustrates a computer system 90 used for executing software to implement the methodology of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be at least one of, inter alia, a printer, a plotter, a computer screen, a magnetic tape, a removable hard disk, a floppy disk, etc. The memory devices 94 and 95 may be at least one of, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 comprises software to implement the methodology of the present invention. The processor 91 executes the computer code 97. The memory device 94 includes input data 96. The input data 96 includes input required by the computer code 97. The output device 93 stores or displays output from the computer code 97. Either or both memory devices 94 and 95 (or one or more additional memory devices not shown in FIG. 9) may be used as a computer usable storage medium (or a computer readable storage medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable storage medium (or said program storage device).

Thus the present invention discloses a process for deploying or integrating computing infrastructure, comprising integrating computer-readable code into the computer system 90, wherein the code in combination with the computer system 90 is capable of executing software to implement the methodology of the present invention.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for processing a schema mapping M from a source schema S to a target schema T, said method performed by executing program code on a processor of a computer system, said method comprising:

determining a schema mapping M' from T to S via processing the schema mapping M, said mapping M comprising at least one constraint σ, each constraint σ consisting of a source-to-target tuple-generating dependencies (s-t tgd), said schema mapping M' comprising at least one constraint σ', each constraint σ' consisting of a disjunctive tgd with constants and inequalities among the constants; and storing the schema mapping M' in at least one computer usable storage device of the computer system and/or outputting the schema mapping M' in at least one output device of the computer system, wherein said determining the schema mapping M' comprises:

creating an equivalent schema mapping M* from M, wherein M* comprises at least one constraint σ*, said at least one constraint σ* being a function of said at least one constraint σ; and generating the at least one constraint σ' by inverting each constraint σ* in M* to generate the schema mapping M' consisting of the at least one constraint σ', wherein said creating M* comprises:

for each constraint σ, determining a set x of variables appearing both in a premise and a conclusion of each constraint σ and forming a conjunction of well-typed equalities among members of x with each constraint σ to generate at least one constraint σ"; and creating M* by forming a union of the at least one constraint σ" and the at least one constraint σ, wherein said inverting each constraint σ* in M comprises:

constructing a set G of minimal generators for a conclusion of each constraint σ* of M*; and inverting each constraint σ* in M* through use of the set G pertaining to each constraint σ*, wherein said constructing the set G of minimal generators comprises:

setting a set G' to an empty set;

adding, to the empty set G', a set of generators for the conclusion of each constraint σ*, wherein each generator of the set of generators comprises a plurality of relational atoms;

after said adding, removing from G' each generator determined to not be a minimal generator satisfying a condition of non-existence of any generator of the set of generators that is a conjunction of a strict subset of the relational atoms in the minimal generator, said removing resulting in G' becoming the set G of minimal generators.

* * * * *